United States Patent [19]

Whisler et al.

[11] Patent Number: 4,702,520
[45] Date of Patent: Oct. 27, 1987

[54] ADJUSTABLE ARMREST WITH INTEGRAL VEHICLE CONTROLS

[75] Inventors: Edwin L. Whisler, Peosta; Frederick D. Griswold, Jr.; Stuart L. Neagle, both of Dubuque, all of Iowa

[73] Assignee: Deere & Company, Moline, Ill.

[21] Appl. No.: 660,209

[22] Filed: Oct. 12, 1984

[51] Int. Cl.⁴ .............................................. B60N 1/06
[52] U.S. Cl. .................................... 297/417; 180/333; 180/334; 297/115; 297/411
[58] Field of Search ............... 297/411, 417, 115, 116, 297/217, 359; 180/315, 333, 334

[56] References Cited

U.S. PATENT DOCUMENTS

| | | | |
|---|---|---|---|
| 3,216,738 | 11/1965 | Bockus | 297/353 X |
| 3,578,379 | 5/1971 | Taylor et al. | 297/411 X |
| 3,580,636 | 5/1971 | Setto | 297/417 |
| 4,140,200 | 2/1979 | Tucek | 180/333 |
| 4,190,284 | 2/1980 | Schmidhuber et al. | 297/113 X |
| 4,200,166 | 4/1980 | Hansen | 297/411 X |
| 4,238,008 | 12/1980 | Higgins et al. | 180/328 |
| 4,244,623 | 1/1981 | Hall et al. | 297/411 X |
| 4,478,308 | 10/1984 | Klaassen | 297/417 |
| 4,496,190 | 1/1985 | Barley | 297/411 |

FOREIGN PATENT DOCUMENTS

| | | | |
|---|---|---|---|
| 1047910 | 2/1979 | Canada | 297/411 |
| 2754543 | 6/1978 | Fed. Rep. of Germany | 180/326 |
| 1153901 | 3/1958 | France | 180/333 |
| 1580260 | 9/1969 | France | 297/411 |
| 2068719 | 8/1981 | United Kingdom | 297/411 |

Primary Examiner—Kenneth J. Dorner
Assistant Examiner—Thomas A. Rendos

[57] ABSTRACT

An armrest including a pivotal forward section containing hand controls and an adjustable second section to align with the forward section.

8 Claims, 3 Drawing Figures

ADJUSTABLE ARMREST WITH INTEGRAL VEHICLE CONTROLS

BACKGROUND OF THE INVENTION

This invention relates to the operator's seat of an off-road vehicle and, more particularly, to the armrest associated with the operator's seat.

In the operator's station of an off-road vehicle, it is known to locate a vehicle function control lever on the respective armrest of the operator's seat. The armrests are sized for convenient access to respective control levers by an operator of typical stature while providing adequate arm support. Because of variation in operator stature, premature fatigue can result from the utilization of conventionally sized armrests by an operator of atypical stature.

SUMMARY OF THE INVENTION

It is, therefore, an object of the present invention to present an armrest including control levers which armrest is adjustable to achieve an optimum position particularly suited to a particular operator and thereby reduce the operator fatigue factor.

A vehicle operator seat armrest includes a forward and rear section adjustably mounted to a support plate attached to the operator seat support system. The forward section of the armrest is pivotably mounted to the support plate and carries a control lever and an electrical switch for controlling respective vehicle funtions. Pivtoably mounted to the forward section is a handle which is responsible for the dislodging and repositioning of an indexing wedge received in an index plate mounted to the support plate to allow pivotal repositioning of the forward section. Repositioning of the forward section alters the angle of operator attack to the control levers.

The rear section of the armrest is comprised of a cushion mounted to a cushion support plate. The cushion support plate includes a vertical portion having first and second vertical slots. The first slot aligns with a horizontal slot in the support plate. The position of the cushion support plate is secured to the support plate by a nut and bolt arrangement in conjunction with friction washer. The second slot aligns to an aperture in the support plate. A threaded stem portion of a knob is journalled through the second slot in the cushion support plate and the aperture of the support plate to thereafter receive a nut. By loosening the knob, the rear section of the armrest can be raised or lowered. Also, the horizontal slot in the support plate allows the rear armrest section to assume varying angles of incline. The adjustment of both the forward section and rear section will allow the proper alignment betwen an operator's arm and the respective control lever to suit a particular operator.

DESCRIPTION OF THE PREFERRED EMBODIMENT

Figure 1:
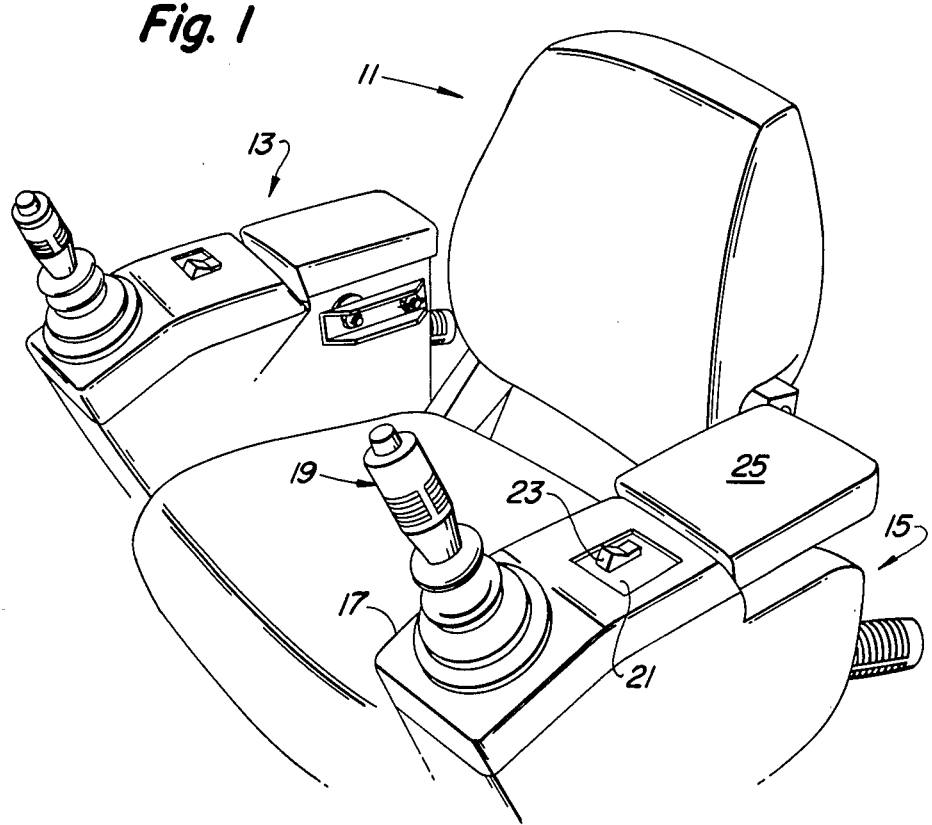
FIG. 1 is a perspective view of a vehicle operator's seat including armrests in accordance with the present invention.

Referring to FIG. 1, a vehicle operator seat, generally indicated as 11, includes a first and second armrest 13 and 15, respectively. Armrest 13 is identical to armrest 15 except that armrest 13 is made for the opposite side of seat 11. Therefore, for the purpose of clarity, only armrest 15 will be described in detail.

Figure 2:
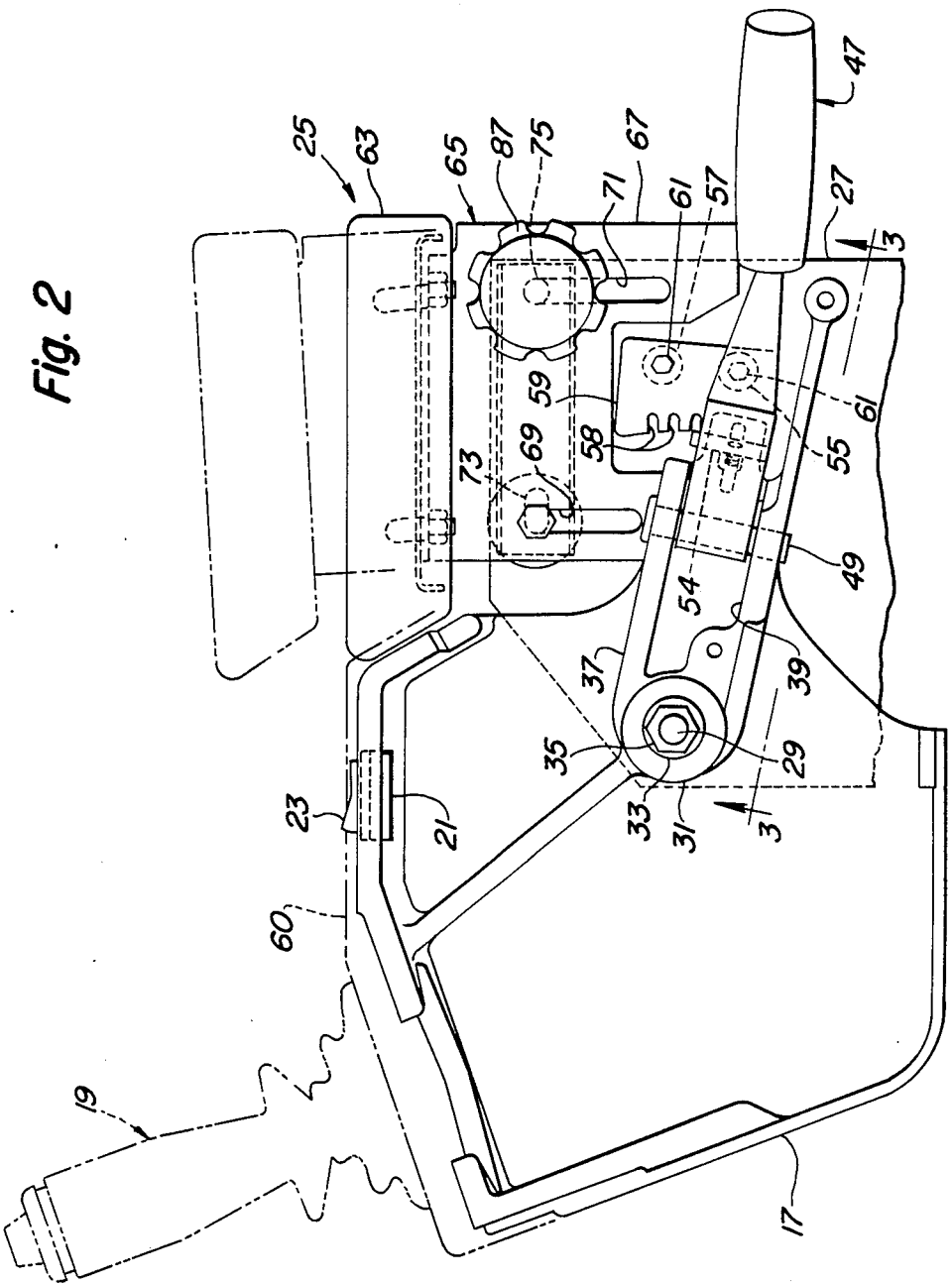
FIG. 2 is a sectioned, side elevational view of the armrest in accordance with the present invention.

Referring to FIGS. 1 and 2, the armrest mount 15 includes a forwardly located control section 17 having mounted therein by any conventional means a conventional hand control lever assembly 19. Also mounted to the control section 17 in a conventional manner is a switch plate 21 including an electrical switch 23. It is observed that the switch plate 21 can accommodate more than one electrical switch 23. It is further noted that hand control lever 19 and switch 23 are responsible for controlling appropriate vehicle functions in a conventional manner. Rearward of the control section 17 is an adjustable arm cushion 25 which is adjustable as to height and angle of incline.

Figure 3:
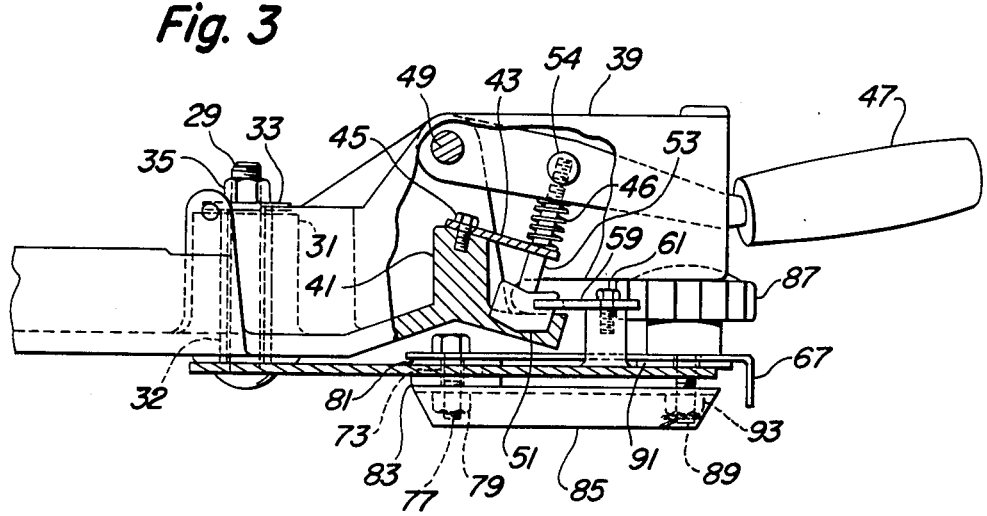
FIG. 3 is a bottom partially sectional view of the armrest adjustment assembly.

Referring more particularly to FIGS. 2 and 3, a support plate 27 is fixedly mounted to a known seat support in a conventional manner (seat support not shown). The support plate 27 extends vertically and laterally from the seat support. Control section 17 includes a formed cylindrical support tube 31. A bolt 29 is jounralled through the support plate 27 into and beyond bushing 32. The bolt 29 is then journalled through the supporting tube 31 followed by a washer 33. A nut 35 is threadaby engaged to the bolt 29 to allow pivotal support of the support section 17 to the support plate 27. Extending rearwardly from the support tube 31 is a pair of formed parallel and opposite arms 37 and 39. The control section 17 further includes a formed, outwardly protruding landing 41 generally located midway along and between arms 37 and 39. A stop 43 is fixably mounted to the landing 41 to extend rearwardly by any conventional means such as by a bolt 45. A handle 47 is pivotably mounted between the arms 37 and 39 by any conventional means such as by a pin 49. An index wedge 51 with a stem 53 is fixably mounted in a cross pin 54 transversely extending through the handle 47. The index wedge 51 is directed inwardly toward the support plate 27. A spring 46 is placed around the stem 53 of the index wedge 51 between the stop 43 and handle 47. The support plate 27 also includes formed mounting posts 55 and 57. An index plate 59 is fixably mounted to the mounting posts 55 and 57 by any conventional means such as by bolts 61. The index plate 59 includes a plurality of C-shaped indexing recesses 58 sized to receive the index wedge 51.

It is observed that when the indexing wedge 51 is received in one of the indexing recesses 58, the position of the control section 17 is secured. By depressing the handle 47 inwardly towards the support plate 27, the index wedge 51 is caused to dislodge from a respective indexing recess 58, thereby, allowing the operator to pivot the control section 17 about bolt 29 for repositioning. By releasing the handle 47, the indexing wedge 51 is then received in another of the indexing recesses 58 to secure the new position of the control section 17. By so doing, the top surface 60 of the control section 17 and necessarily control lever 19 assumes a new angle relative to the horiztonal.

The arm cushion 25, located rearwardly of the control section 17 is comprised of a cushion 63 fixably mounted by any conventional means to a cushion support plate 65 having a vertical portion 67. The cushion support plate portion 67 includes first and second slots 69 and 71, respectively, each slot extending in a generally vertical direction. A third slot 73 extends horizontally in the support plate 27. The support plate 27 also includes an aperture 75. To attach the cushion support plate 65 to the support plate 27, a bolt 77 extends through the first slot 69 in the cushion support plate portion 67. The bolt 77 then extends through a first friction washer 81, horizontal slot 73 of support plate 27, a second friction washer 83, and a channel member 85 thereafter secured by a self-locking nut 79. The friction washer 83 has a thickness generally greater than twice that of friction washer 81.

A knob 87 has a threaded stem 89. The stem 89 of knob 87 extends through slot 71 of cushion support plate 27 and, thereafter, through a washer 91, aperture 75 in support plate 65 and channel member 85. A nut 93 is then secured to stem 89 followed by a cotter pin to prevent losing knob 87.

It is observed that the arm cushion 25 can be raised and tilted for adjusting the height and angle of incline of arm cushion 25 to be complimentary to the control section 17. Tilting of the arm cushion 25 is accomplished by allowing bolt 77 to be slidably displaced in slot 73. Securing the arm cushion 25 in a new position is accomplished by tightening knob 87 which produces a clamping effect through support plate 65 and channel member 85.

It is observed that through minor alterations in the configurations of the forward section 17 and the cushion 63, the electrical switch plate 21 carrying swtich 23 can be mounted on the cushion 63.

We claim:

1. In an operator's support for a movable machine including a seat support, supporting a horizontally extending seat surface and back resting means for limiting rearward motion of an operator seated on said seat surface, and an armrest laterally offset form said seat surface and upwardly projecting beyond the same, wherein an improved armrest comprising:
   a support plate fixably mounted to said seat support positioned lateral to said seat surface and extending vertically;
   a forward section pivotably mounted to said support plate including a hand controlled lever assembly fixably mounted to said forward section's top surface and first means for pivotally and selectively positioning said forward section within a defined arc;
   a rearward section adjustably mounted to said support plate including a second means for adjustably mounting said rear section to said support plate such that said rear sections angle of incline and vertical position can be selectively adjusted to a complimentary, generally linear alignment to said top surface of said forward section,
   said second means being comprised of a cushion support plate having a generally horizotally extending cushion fixably mounted atop thereto, said cushion support plate having a vertically, downward extending portion, said portion having a first and second vertically extending slot in opposite and generally parallel spaced apart relationship;
   said support plate having a forwardly located horizontal slot and a rearwardly located aperture;
   a bolt, having a bolt head, extending through said first slot in said cushion support plate cushion portion and said horizontal slot in said support plate and is secured therein by a nut;
   a friction washer placed around said bolt and between said cushion support plate portion and said support plate; and
   a knob having a threaded stem extending through said second vertical slot in said cushion support plate portion and said aperture in said support plate secured there by a nut.

2. An improved armrest as defined in claim 1 wherein said first means comprises:
   an elongated handle pivotably mounted to said forward section in a cantilevered fashion such that said handle can be pivoted inwardly toward the support plate from a normal position;
   an index wedge fixably mounted to said handle directed inwardly to said support plate;
   an index plate fixably mounted to said support plate having a plurality of vertically arranged indexing recesses adapted and constructed to receive said index wedge;
   third means for biasing said handle to a normal position, whereby said handle can be inwardly pivoted overcoming said biasing means to dislodge said index wedge from one of said recesses in said index plate, said handle can be further vertically displaced to pivot said forward section to a new position, said handle can be thereafter released to allow said indexing wedge to lodge in another one of said recesses securing said first section in a new position.

3. An improved armrest as claimed in claim 2 wherein said third means comprises:
   a landing formed on and extending outwardly from the forward section, a stop member fixably mounted to said landing and having a portion of said index wedge extending therethrough; and
   a spring placed around said index wedge biased between said stop member and said handle.

4. An improved armrest as claimed in claim 1 wherein said forward section further comprises an electrical switch fixably mounted to said forward section rearward and opposite to said hand control lever on said top surface.

5. In an operator's support for a movable machine including a seat support, supporting a horizontally extending seat surface and back resting means for limiting rearward motion of an operator seated on said seat surface, and an armrest laterally offset from said seat surface and upwardly projecting beyond the same, wherein an improved armrest comprising:
   a support plate fixably mounted to said seat support positioned lateral to said seat surface and extending vertically;
   a forward section pivotably mounted to said support plate including a hand controlled lever assembly fixably mounted to said forward section's top surface and first means for pivotally and selectively positioning said forward section within a defined arc;
   a rearward section adjustably mounted to said support plate including a second means for adjustably mounting said rear section to said support plate such that said rear section's angle of incline and vertical position can be selectively adjusted to a complimentary, generally linear alignment to said top surface of said forward section;

said second means being comprised of a cushion support plate having a generally horizontally extending cushion fixably mounted atop thereto, said cushion support plate having a vertically downward extending portion, said portion having a first and second vertically extending slot in opposite and generally parallel spaced apart relationship;

said support plate having a forwardly located, horizontal slot and rearwardly located aperture;

a first friction washer;

a second friction washer;

an elongated channel member;

a bolt extending sequentially through said first slot in said cushion support plate portion, said first friction washer, said horizontal slot in said support plate, said second friction washer and thereafter through said channel member;

a first nut secured to said bolt abutting to said channel member;

a thrid friction washer;

a knob having a threaded stem extending sequentially through said second slot in said cushion support plate portion, said third friction washer, said support plate and thereafter through said channel member; and a second nut secured to said stem abutting to said channel member.

6. An improved armrest as defined in claim 5 wherein said first means comprises:

an elongated handle pivotably mounted to said forward section in a cantilevered fashion such that said handle can be pivoted inwardly toward the support plate from a normal position;

an index wedge fixably mounted to said handle directed inwardly to said support plate;

an index plate fixably mounted to said support plate having a plurality of recesses vertically graduated sized to receive said index wedge;

third means for biasing said handle to a normal position, whereby said handle can be inwardly pivoted overcoming said biasing means to dislodge said index wedge from one of said recesses in said index plate, said handle can be further vertically displaced to pivot said first section to a new position, said handle can be thereafter released to allow said indexing wedge to lodge in another one of said recesses securing said first section in a new position.

7. An improved armrest as claimed in claim 6 wherein said third means comprises:

a landing formed on and extending outwardly from support plate, a stop member fixably mounted to said landing and having a portion of said index wedge extending therethrough; and a spring placed around said index wedge biased between said stop member and said handle.

8. An improved armrest as claimed in claim 5 wherein said forward section further comprises an electrical switch fixably mounted to said forward section rearward and opposite to said hand control lever on said top surface.

* * * * *

UNITED STATES PATENT AND TRADEMARK OFFICE
CERTIFICATE OF CORRECTION

PATENT NO. : 4,702,520

DATED : 27 October 1987

INVENTOR(S) : Edwin L. Whisler et al.

It is certified that error appears in the above-identified patent and that said Letters Patent is hereby corrected as shown below:

Column 3, line 40, delete "form" and insert therefor -- from -- ; column 5, line 22, delete "thrid" and insert therefor -- third -- .

Signed and Sealed this

Thirty-first Day of January, 1989

Attest:

DONALD J. QUIGG

Attesting Officer

Commissioner of Patents and Trademarks